May 3, 1927.  1,627,031
J. E. HARRIS
BEARING FOR ENGINES, AIR COMPRESSORS, AND THE LIKE
Filed June 8, 1925
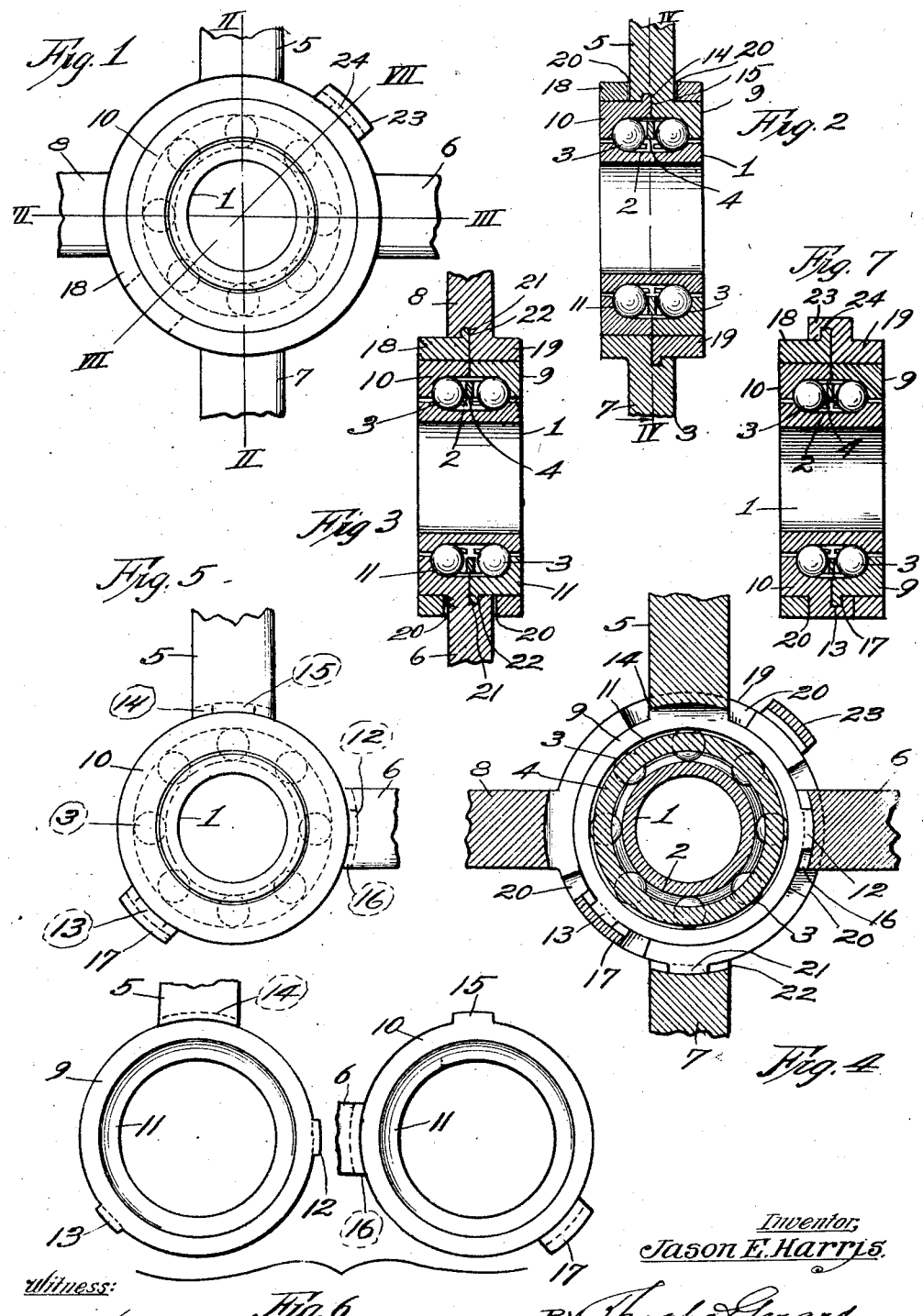
Inventor:
Jason E. Harris Patented May 3, 1927.

1,627,031

UNITED STATES PATENT OFFICE.

JASON E. HARRIS, OF HOWARD, KANSAS.

BEARING FOR ENGINES, AIR COMPRESSORS, AND THE LIKE.

Application filed June 8, 1925. Serial No. 35,597.

This invention relates to connecting rod bearings for multiple cylinder engines, air compressors and the like, and my object is to produce a bearing susceptible of use with engines in which the crank shaft remains stationary while the cylinders revolve around it, it being understood however, that the bearing is also practicable for use in the more conventional type of engine in which the shaft revolves and the cylinders are stationary.

A further object is to produce a connecting rod bearing for a multiple cylinder engine, which lies in the plane of the major axes of all of the cylinders so that the thrust of the pistons shall be direct and without side thrust. Another object is to provide a narrow bearing for a series of connecting rods lying in the same plane, in which the bearing elements of the rods detachably interlock each other in position against lateral displacement.

A bearing rod connection of the character above outlined can be produced at relatively low cost, and makes provision for maximum strength and minimum weight, in that the piston thrust of the rods on the bearing is always direct, and the crank case—the relatively wide and heavy part of the ordinary engine—may be materially reduced in width and weight.

With the objects set forth as desirable in view, the invention consists in certain novel and useful features of construction and combinations of parts as hereinafter described and claimed; and in order that it may be fully understood reference is to be had to the accompanying drawings, in which:—

Figure 1 is a side elevation of the bearing.

Figure 2 is a section on the line II—II of Figure 1.

Figure 3 is a section on the line III—III of Figure 1, but turned around so that its axis shall be parallel with the axis of the bearing as shown by Figure 2, for convenience in readability.

Figure 4, is a section on the line IV—IV of Figure 2.

Figure 5 is a side elevation of the two inner rings or elements of the bearing.

Figure 6 is an elevational view of the inner faces of the two bearing elements disclosed by Figure 5.

Figure 7 is a section on the line VII—VII of Figure 1.

In the said drawings, 1 is a collar adapted to be shrunk or otherwise rigidly mounted on the crank shaft (not shown), of an engine, and said collar is preferably provided with a peripheral channel 2, constituting a ball-race, two series of balls 3 in a suitable skeleton cage 4, occupying the ball-race at opposite sides of and equal distances from its center.

As shown, there are four connecting rods, 5 and 6 for the pistons of two cylinders, and 7 and 8 for the pistons of the other pair of cylinders, the pistons and cylinders being omitted from the drawing, as having no dependent relation to the bearing.

The inner ends of the rods 5 and 6 terminate respectively in similar rings 9 and 10, abutting at their inner faces in the plane of the axes of the rods, as shown clearly by Figure 2, said rings being internally channeled at 11 to receive the cage and balls. Ring 9 has a pair of short peripheral arcuate flanges 12 and 13, and an internal arcuate groove 14 at the junction of the connecting rod 5 with such ring, the said groove and flange 12 being disposed at right angles to each other, and the flange 13 at the opposite side of the axis of the ring and about equally distant from flange 12 and the groove 14, as shown clearly by Figures 4 and 5.

The ring 10 has a short peripheral arcuate flange 15 to engage groove 14 (see Figures 2 and 5), an arcuate groove 16 at the junction of the connecting rod 6 with the ring, for the reception of flange 12 (see Figure 4), and an arcuate grooved peripheral lug 17 for the reception of flange 13. In assembling, the said rings are abutted together at their inner faces with the rods at a lesser angle apart than a right angle so that the various flanges, grooves and lugs are relatively offset, and then the rings are rotated oppositely to cause the respective flanges 12, 13 and 15 to enter the groove 16, the groove of lug 17 and the groove 14, respectively. The two rings are thus interlocked together as regards lateral displacement, but are capable of relative rotary or oscillatory movement, it being understood that as they are fitted together they are also fitted on the ball-bearing.

The inner ends of the rods 7 and 8, respectively, terminate in rings 18 and 19 of diameter fitting snugly over rings 10 and 9, respectively, and provision is made for permitting the said rings 18 and 19 to abut at their inner faces, by providing them with notches 20 in their inner edges, two of such notches 20 of rings 18 and 19, accommodating the connecting rods 5 and 6, as shown by Figures 2, 3 and 4, the said notches being of length to accommodate relative rotary or oscillatory movements of the various rings. The rings 18 and 19 other than their difference in size and their formation with the notches 20, and the grooves for the ball bearing, are in all respects similar to rings 9 and 10, that is to say, each is provided with a peripheral flange 21 engaging a groove 22 of the other, corresponding to flanges 12 and 15 and grooves 16 and 14 of rings 9 and 10, and ring 19 has a peripheral grooved lug 23 and ring 18, a peripheral flange 24, engaging the lug 23 as in Figure 1.

In operation the rings turn on or with the ball bearing and are also free to oscillate independently, the thrust from all of the connecting rods being toward the center of the bearing and always radially of its axis. The parts of the bearing can be easily and quickly assembled in operative relation. The bearing is inexpensive and possesses the desirable qualities of simplicity and durability, in addition to those hereinbefore enumerated. It is also susceptible to modification within the spirit and scope of the appended claims.

I claim:

1. A bearing comprising a pair of inner rings and a pair of outer rings arranged in telescopic relation, the rings of each pair having tongue and grooved connections to hold them against separating movement, and rods respectively for and extending radially outward from said rings, the axis of all of the rods lying in the plane of the inner edges of the rings.

2. A bearing comprising a pair of inner rings and a pair of outer rings arranged in telescopic relation, the rings of each pair having tongue and grooved connections to hold them against separating movement, and rods respectively for and extending radially outward from said rings, the axis of all of the rods lying in the plane of the inner edges of the rings, the outer pair of rings having notches accommodating the rods of the inner pair of rings.

3. A bearing comprising a collar having a ball-race, a ball bearing encircling the collar and engaging the ball-race thereof, a pair of rings of equal diameter fitting over the ball bearing and provided with internal channels accommodating the ball bearing, means interlocking the rings together as regards separable movement but leaving them free for independent rotation, connecting rods rigid with said rings respectively and extending radially therefrom, a pair of outer rings fitting rotatably upon the inner rings and interlocked together as regards lateral separating movement and relatively rotatable, and provided respectively with radial connecting rods; said outer rings having notches in the inner edges through which the connecting rods of the inner rings extend radially outward.

In witness whereof I hereunto affix my signature.

JASON E. HARRIS.